United States Patent [19]

Funahashi

[11] Patent Number: 4,871,152
[45] Date of Patent: Oct. 3, 1989

[54] FLUID-FILLED RESILIENT BUSHING STRUCTURE WITH RADIAL VANES

[75] Inventor: Yoshiki Funahashi, Iwakura, Japan
[73] Assignee: Takai Rubber Industries, Ltd., Japan
[21] Appl. No.: 320,891
[22] Filed: Mar. 10, 1989

Related U.S. Application Data

[63] Continuation of Ser. No. 69,203, Jul. 1, 1987, abandoned.

[30] Foreign Application Priority Data

Jul. 4, 1986 [JP] Japan .................. 61-158363

[51] Int. Cl.$^4$ .................. F16M 5/00; F16F 9/16; F16B 1/00
[52] U.S. Cl. .................. 267/140.1; 248/562; 267/293; 403/228
[58] Field of Search .................. 267/219, 140.1, 281, 267/279, 292, 293, 136, 141.2, 35; 248/562, 636, 609, 638; 280/673; 403/225, 228; 16/2; 384/99, 132, 140, 222, 234, 297; 180/300, 312

[56] References Cited

U.S. PATENT DOCUMENTS

| | | | |
|---|---|---|---|
| 3,642,268 | 2/1972 | Hipsher | 267/281 |
| 3,698,703 | 10/1972 | Hipsher | 267/140.1 |
| 3,850,418 | 11/1974 | Hipsher et al. | 267/281 |
| 4,749,173 | 6/1988 | Kanda | 267/140.1 |
| 4,749,174 | 6/1988 | Kanda | 267/140.1 |
| 4,756,514 | 7/1988 | Kanda | 267/140.1 |

FOREIGN PATENT DOCUMENTS

| | | | |
|---|---|---|---|
| 0009120 | 8/1979 | European Pat. Off. | |
| 1145861 | 3/1963 | Fed. Rep. of Germany | 267/292 |
| 2394715 | 1/1979 | France | |
| 2495718 | 6/1982 | France | |
| 0063141 | 5/1981 | Japan | 267/141.2 |
| 0034541 | 2/1985 | Japan | 267/140.1 |
| 0031736 | 2/1986 | Japan | 267/140.1 |

OTHER PUBLICATIONS

Patent Abstract of Japan, vol. 9, No. 303 (M-434) [2026] Nov. 30, 1985, JP-A-6 139 940 (Bridgestone K.K.).
Patent Abstract of Japan, vol. 10, No. 6, (M-445) [2063] Jan. 11, 1986, JP-A-60 168 931 (Nissan Jidosha K.K.).
Patent Abstract of Japan, vol. 10, No. 10 (M-446) [2067] Jan. 16, 1986, JA-A-60 172 743 (Kinugawa Gomu Kogyo K.K.).
Patent Abstract of Japan, vol. 10, No. 14 (M-447) [2071] Jan. 21, 1986, JA-A-60 175 836 (Toyota Jidosha K.K.).

*Primary Examiner*—Robert J. Oberleitner
*Attorney, Agent, or Firm*—Oliff & Berridge

[57] ABSTRACT

A fluid-filled resilient bushing having inner and outer sleeves, and a resilient member interposed between the inner and outer sleeves for primarily damping and isolating vibrating applied in a first diametric direction of the bushing. The bushing has a pair of first fluid chambers disposed in mutually opposed relation with each other in the first diametric direction, a pair of second fluid chambers disposed in mutually opposed relation with each other in a second diametric direction perpendicular to the first diametric direction, and at least one orifice through which the pair of first fluid chambers communicate with each other, so as to permit a working fluid to flow between the first fluid chambers upon application of the vibrations. The bushing includes a pair of vanes fixedly supported on the inner sleeve so as to extend therefrom in the pair of second fluid chambers, respectively, toward the outer sleeve, such that the portions defining the second fluid chambers, and a periphery of each of the vanes cooperate to define a predetermined gap in a plane of said each vane parallel to an axis of the bushing structure.

11 Claims, 4 Drawing Sheets

FLUID-FILLED RESILIENT BUSHING STRUCTURE WITH RADIAL VANES

This is a continuation of application Ser. No. 069,203 filed July 1, 1987, now abandoned.

BACKGROUND OF THE INVENTION

1. Field of the Invention

The present invention relates in general to a generally cylindrical, fluid-filled resilient bushing or mounting structure, adapted to exhibit excellent damping characteristic for low-frequency vibrations, and provide an effectively reduced dynamic spring constant for high-frequency vibrations.

2. Discussion of the Prior Art

A resilient mounting structure is known in the art of automotive vehicles, as a device for connecting members in a suspension system, or mounting a power unit on a body or frame of the vehicle. Such a mounting structure includes a resilient member interposed between radially spaced-apart inner and outer metal sleeves, and is installed such that the inner and outer sleeves are secured to suitable fittings for elastic connection of the two members of the vehicle, in such a manner as to primarily damp and isolate vibrations applied to the mounting structure in a diametric direction thereof, i.e., in a direction perpendicular to its axis. For example, such a resilient mounting structure is used as an engine mount bushing for mounting a power unit (including an engine) on a transverse F—F vehicle (front-engine, front-drive vehicle with its engine oriented transversely of the vehicle), such that the engine mount functions as a rolling stop for protecting the power unit from rolling vibrations.

In the recent years, various types of fluid-filled resilient bushings have been proposed as an improved resilient bushing, as disclosed in U.S. Pat. Nos. 3,642,268 and 3,698,703. These fluid-filled resilient bushings have vibration-isolating capability based on the elastic deformation of a resilient member, and vibration-damping capability based on a flow resistance of a fluid through the bushing and an inertia of the fluid mass, thereby exhibiting a comparatively low dynamic spring constant or rate for vibrations of a desired frequency range. More specifically described, the fluid-filled resilient bushings disclosed in the above-identified patents use a generally annular rubber block interposed between an inner sleeve and an outer sleeve, such that the rubber block partially defines a pair of fluid chambers which are filled with a suitable incompressible fluid. The bushings are adapted so that the fluid may flow through an orifice or orifices, from one of the two chambers to the other.

The fluid-filled resilient bushings mentioned above are required to demonstrate a sufficiently low dynamic spring contant for various frequency ranges of the vibrations to be applied thereto, depending upon the environments in which the bushings are used. For instance, an engine mount in the form of a bushing is required to provide a low dynamic spring constant for vibrations having comparatively high frequency ranges, to prevent booming noises and-thru-engine noises.

In the fluid-filled resilient bushing or mounting structures, however, the cross sectional area and length of the orifice for fluid communication of the two fluid chambers are generally limited by the size and construction of the bushing structures. Usually, the orifice has a relatively large length and a relatively small cross sectional area. In this case, the bushing structures may provide a sufficiently low dynamic spring constant for low-frequency vibrations, for example, vibrations whose frequency is 50 Hz or lower. However, the dynamic spring constant of the bushing structures cannot be made low enough for vibrations having higher frequencies.

SUMMARY OF THE INVENTION

It is therefore an object of the present invention to provide a improved fluid-filled resilient bushing structure, which is capable of not only exhibiting excellent damping characteristic for low-frequency vibrations, but also providing a sufficiently low dynamic spring constant for high-frequency vibrations.

The above object may be attained according to the principle of the present invention, which provides a fluid-filled resilient bushing structure having an inner sleeve, and outer sleeve disposed radially outwardly of the inner sleeve, and a generally annular resilient member interposed between the inner and outer sleeves for elastically connecting the inner and outer sleeves, and thereby primarily damping and isolating vibrations applied in a first diametric direction of the bushing structure, the bushing structure comprising: (a) first means for defining a pair of first fluid chambers which are disposed in mutually opposed relation with each other in the first diametric direction, such that the inner sleeve is disposed between the first fluid chambers in the first diametric direction; (b) second means for defining a pair of second fluid chambers which are disposed in mutually opposed relation with each other in a second diametric direction perpendicular to the first diametric direction, such that the inner sleeve is disposed between the second fluid chambers in the second diametric direction, the first and second pairs of fluid chambers being filled with a working fluid; (c) third means for defining at least one orifice through which the pair of first fluid chambers communicate with each other, so as to permit the working fluid to flow between the first fluid chambers upon application of the vibrations; and (d) a pair of vanes fixedly supported on the inner sleeve so as to extend therefrom in the pair of second fluid chambers, respectively, toward the outer sleeve, such that the second means and a periphery of each of the pair of vanes cooperate to define a predetermined gap in a plane of said each vane parallel to an axis of the bushing structure.

In the fluid-filled resilient bushing structure of the present invention constructed as described above, the working fluid such as an incompressible fluid is forced to flow through the at least one orifice from one of the pair of first fluid chambers to the other, due to pressure rise and drop in the two first fluid chambers when vibrations having a comparatively large amplitude are applied between the inner and outer sleeves of the instant bushing structure, in the first diametric direction perpendicular to its axis. Since the orifice or orifices are properly dimensioned, the input vibrational load is effectively damped due to a flow resistance of the fluid and an inertia of the fluid mass. Thus, the low-frequency large-amplutide vibrations can be damped as desired.

When high-frequency vibrations having a relatively small amplitude are applied to the bushing structure in the first diametric direction, the inner and outer sleeves are elastically displaced or deformed relative to each other in the first diametric direction, whereby the pair of vanes fixedly supported on the inner sleeve so as to radially extend therefrom a suitable length within the respective second fluid chambers are oscillated within the second fluid chambers, in response to the radial oscillating movements of the inner sleeve relative to the outer sleeve. As a result, the fluid is forced to flow through the gap formed around the periphery of each vane, from one of two sections of each second fluid chamber substantially separated by the corresponding vane, to the other section of that second fluid chamber. Namely, the gap formed between the periphery of each vane and the surfaces defining each second fluid chamber serves as an orifice, so that the input high-frequency vibrations may be effectively damped or isolated due to a flow resistance of the fluid through the gap, and an inertia of the fluid masses.

In the above arrangement, therefore, high-frequency vibrations of a desired frequency range can be damped or isolated by suitably dimensioning the vanes in the second fluid chambers, that is, by suitably determining the cross sectional area of the gap formed between the periphery of each vane and the surfaces defining the corresponding second fluid chamber, as measured in the plane of the vane. Thus, the vanes properly dimensioned relative to the periphery of the second fluid chambers are effective to reduce the amount of transfer of high-frequency vibrations through the instant bushing structure, i.e., effective to lower the dynamic spring constant of the bushing structure.

It follows from the foregoing that the instant fluid-filled resilient bushing structure is capable of not only exhibiting excellent damping characteristic for low-frequency vibrations, but also advantageously providing a sufficiently low dynamic spring rate for high-frequency vibrations.

According to one feature of the present invention, the at least one orifice communicates with at least one of the pair of second fluid chambers so that the pair of first fluid chambers communicate with each other via the at least one of the second fluid chambers.

According to another feature of the invention, the resilient member has a pair of voids formed therethrough in an axial direction of the bushing structure, such that the voids are disposed in mutually opposed relation with each other in the first diametric direction.

According to a further feature of the invention, the bushing structure further comprises at least one hat-shaped member which has an intermediate semi-circular portion engaging a corresponding half of an outer circumferential surface of the inner sleeve, and a pair of straight planar portions which extend from opposite ends of the semi-circular portion into the pair of second fluid chambers, respectively, thereby functioning as the pair of vanes.

In accordance with a still further feature of the invention, the pair of vanes are dimensioned so that an area of the gap formed in one of the second fluid chambers, as measured in the plane of each vane, is different from an area of the gap formed in the other of the second fluid chambers.

In accordance with a yet further feature of the invention, the resilient member has a pair of first pockets formed therein in mutually opposed relation with each other in the first diametric direction, such that the first pockets are open in an outer circumferential surface of the resilient member and closed by the outer sleeve, whereby the pair of first fluid chambers are formed.

According to yet another feature of the invention, the resilient member has a pair of second pockets formed therein in mutually opposed relation with each other in the second diametric direction, such that the second pockets are open in an outer circumferential surface of the resilient member and closed by the outer sleeve, whereby the pair of second fluid chambers are formed.

According to a still further feature of the invention, the pair of vanes are covered by a corresponding pair of rubber layers.

According to another feature of the invention, the resilient member has a pair of raised portions which protrude in the pair of first fluid chambers so that the raised portions are abuttable against an inner circumferential surface of the outer sleeve.

BRIEF DESCRIPTION OF THE DRAWINGS

The above and optional objects, features and advantages of the present invention will be better understood by reading the following detailed description of preferred embodiments of the invention, when considered in conjunction with the accompanying drawings, in which.

DETAILED DESCRIPTION OF THE PREFERRED EMBODIMENTS

To further clarify the concept of the present invention, there will be described in detail the preferred embodiments of the invention in the form of engine mounts for installing a power unit on the body of a motor vehicle, by reference to the accompanying drawings.

Figure 1:
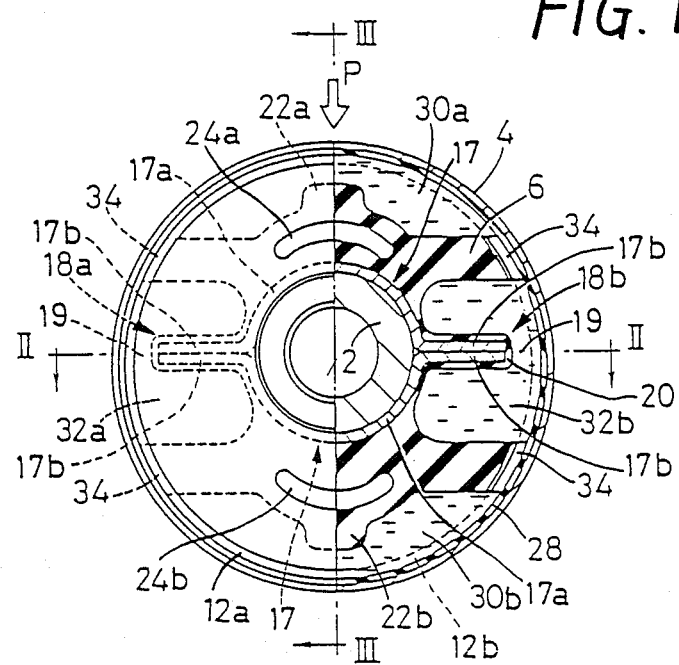
FIG. 1 is an elevational view partly in transverse cross section of one embodiment of a fluid-filled resilient bushing structure of the present invention in the form of an engine mount.
Figure 2:
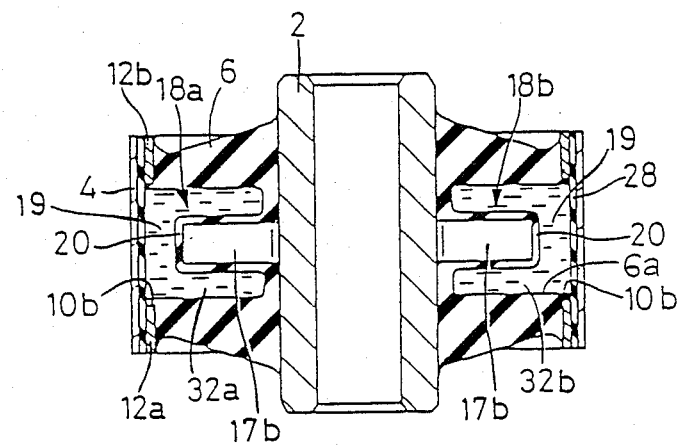
FIGS. 2 and 3 are cross sectional views taken along lines II—II and III—III of FIG. 1, respectively.
Figure 3:
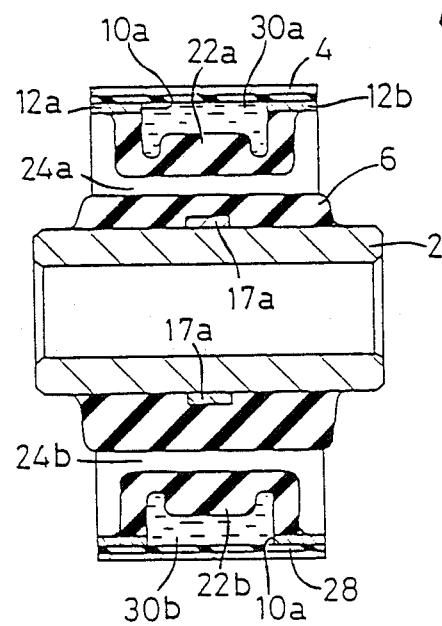

Referring first to the elevational cross sectional views of FIGS. 1-3, there is shown the engine mount which includes a relatively thick-walled inner sleeve 2 made of a metal, and a relatively thin-walled outer sleeve 4 also made of a metal. The outer sleeve 4 is disposed radially outwardly of the inner sleeve 2 such that the two sleeves 2, 4 are slightly eccentric with each other in a diametric direction in which the instant engine mount is adapted to receive a vibrational load. This direction is indicated at P in FIG. 1, and is hereinafter referred to as "first diametric direction" or "vibration-input direction" where appropriate.

Between the inner and outer sleeves 2, 4, there is interposed a generally annular resilient member in the form of a rubber block 6 made of a suitable rubber material, so that the rubber block 6 elastically connects the inner and outer sleeves 2, 4. The engine mount is installed on the vehicle such that the inner sleeve 2 is secured to one of the power unit and the body of the vehicle, while the outer sleeve 4 is secured to the other.

With the engine mount installed in place, the inner and outer sleeves 2, 4 are concentric or coaxial with each other, due to a static load or weight of the power unit.

Figure 4:
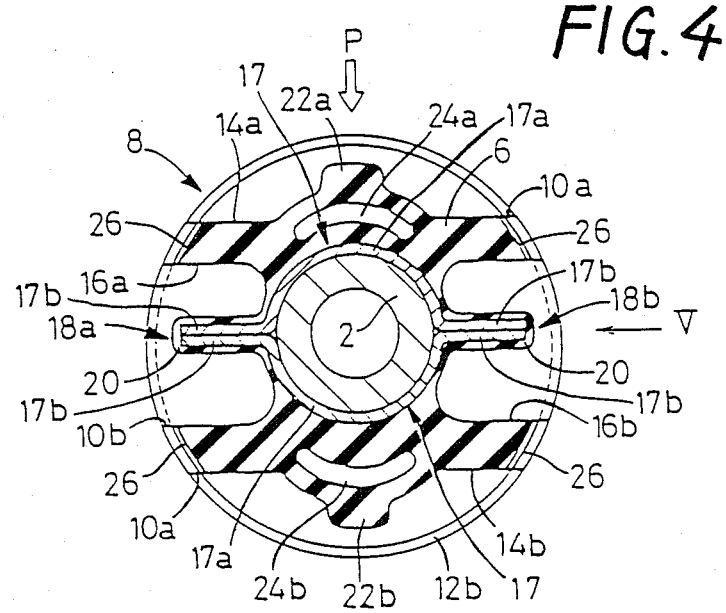
FIG. 4 is an elevational view in transverse cross section of a sub-assembly including an inner sleeve, an outer seeve and a rubber block between the sleeves, used for the engine mount of FIG. 1.
Figure 5:
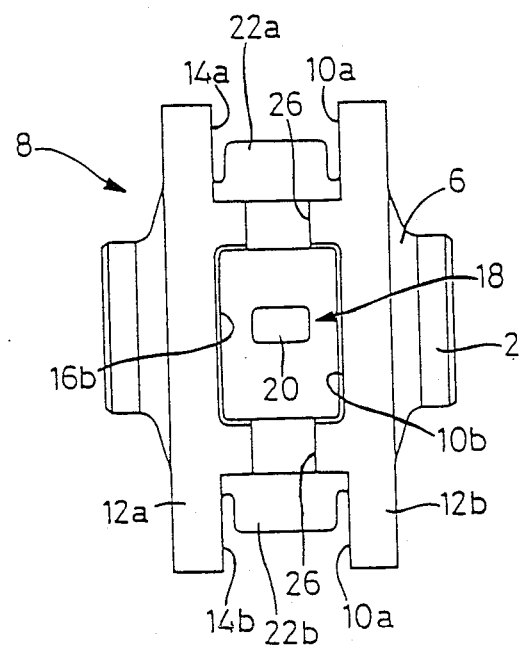
FIG. 5 is an elevational view taken in the direction of arrow V in FIG. 4.

The instant engine mount uses a sub-assembly 8 which includes the inner sleeve 2 and the rubber block 6 described above, and a pair of metal rings 12a, 12b, as illustrated in FIGS. 4 and 5. The metal rings 12a, 12b are secured to the outer circumferential surface of the rubber block 6 by means of vulcanization, and are arranged side by side in the axial direction of the engine mount, as most clearly shown in FIG. 5. Each of the metal rings 12a, 12b has a first pair of cutouts 10a which are opposed to each other in the first diametric direction or vibration-input direction, and a second pair of cutouts 10b which are opposed to each other in a second diametric direction perpendicular to the first diametric direction. Namely, the four cutouts 10a, 10b are alternately disposed in spaced-apart relation with each other in the circumferential direction of the metal ring 12a, 12b.

The inner sleeve 2 is secured at its outer surface to the rubber block 6 by means of vulcanization. The rubber block 6 has a pair of first pockets 14a, 14b, and a pair of second pockets 16a, 16b, which pockets are all open in the outer circumferential surface of the rubber block 6. The first pockets 14a, 14b are aligned with the corresponding pairs of opposed cutouts 10a, 10a of the two metal rings 12a, 12b, while the second pockets 16a, 16b are aligned with the corresponding pairs of opposed cutouts 10a, 10b. Thus, the first pockets 14a, 14b are disposed in mutually opposed relation with each other in the first diametric direction, such that the inner sleeve 2 is disposed between the first pockets 14a, 14b in the first diametric direction, as most clearly shown in FIG. 4. On the other hand, the second pockets 16a, 16b are disposed in mutually opposed relation with each other in the second diametric direction, such that the inner sleeve 2 is disposed between the second pockets 16a, 16b in the second diametric direction. In other words, the first and second pockets 14a, 14b, 16a, 16b are disposed alternately in spaced-apart relation with each other in the circumferential direction of the engine mount.

The pair of second pockets 16a, 16b, which are symmetrical with respect to the inner sleeve 2, have a radial depth adjacent to the outer surface of the inner sleeve 2, as shown in FIGS. 1 and 4. Within the second pockets 16a, 16b, there are fixedly disposed a pair of vanes 18a, 18b, respectively. The vanes 18a, 18b are supported by the inner sleeve 2, such that the planes of the vanes 18a, 18b are substantially perpendicular to the axis of the inner sleeve 2, and that the vanes 18a, 18b are located almost in the middle of the second pockets 16a, 16b circumferentially of the engine mount. These vanes 18a, 18b have a radial length smaller than the radial wall thickness of the rubber block 6, and an axial width smaller than the axial dimention of the second pockets 16a, 16b which is determined by axially opposed surfaces 6a, 6a of the rubber block 6, as illustrated in FIG. 2. The vanes 18a, 18b are covered by respective protective rubber layers 20, 20 having a suitable thickness. The rubber layers 20, 20 are integral parts of the rubber block 6, which extend from the inner portion of the block 6 adjacent to the outer surface of the inner sleeve 2.

Stated in more detail, the vanes 18a, 18b are constituted by straight planar portions 17b, 17b of a pair of hat-shaped members 17, 17, as depicted in FIGS. 1 and 4. Each hat-shaped member 17 has an intermediate semi-circular portion 17a which engages a corresponding half of the outer circumferential surface of the inner sleeve 2, and the pair of straight planar portions 17b, 17b which extend from opposite ends of the semi-circular portion 17a into the second pockets 16a, 16b. The hat-shaped members 17, 17 are fitted on the inner sleeve 2 such that the intermediate semi-circular portions 17a, 17a cooperate to surround the inner sleeve 2, while the straight planar portions 17b, 17b are butted together so as to provide the pair of vanes 18a, 18b which radially extend into the second pockets 16a, 16b, respectively, as indicated above. The two hat-shaped members 17, 17 are secured to each other at their straight portions 17b, 17b, and are press-fitted on the inner sleeve 2.

The pair of first pockets 14a, 14b opposed to each other in the first diametric direction, which are symmetrical with respect to the inner sleeve 2, have a generally sectorial shape in cross section as indicated in FIG. 4, and have a comparatively small depth. The rubber block 6 has a pair of arcuate portions which protrude in the first pockets 14a, 14b, from the diametrically opposed portions adjacent to the inner sleeve 2. These arcuate portions are formed at their central portions with a pair of raised portions 22a, 22b, respectively. These raised portions 22a, 22b are formed such that their radial end faces are spaced apart from the arcuate periphery of the corresponding first pockets 14a, 14b by a suitable distance in the radial direction of the rubber block 6. As described later, the raised portions 22a, 22b function as radial stop portions for avoiding an excessive amount of elastic deformation of the rubber block 6.

The rubber block 6 has a pair of arcuate voids 24a, 24b formed therethrough in the axial direction. These arcuate voids 24a, 24b are positioned between the inner sleeve 2, and the respective raised portions 22a, 22b. Namely, the arcuate voids 24a, 24b are disposed in mutually opposed relation with each other in the first diametric direction of the engine mount, such that the inner sleeve 2 is located therebetween.

The rubber block 6 further has four orifice grooves 26 formed in the circumferential direction, in respective four portions of the outer circumferential surface which are located between the two metal rings 12a, 12b, as indicated in FIG. 5. The orifice grooves 26 connect the first pockets 14a, 14b to the second pockets 16a, 16b, so that the two first pockets 14a, 14b communicate with each other via the orifices 26 and the second pockets 16a, 16b, as most clearly shown in FIG. 4.

The sub-assembly 8 is manufactured in the following manner. Initially, the pair of hat-shaped members 17, 17 are press-fitted on an axially central portion of the inner sleeve 2. This assembly 2, 17, 17 and the two metal rings 12a, 12b are suitably set in a vulcanization mold, and an unvulcanized rubber material is poured into the mold, so that the rubber block 6 is formed between the inner sleeve 2 and the metal rings 12a, 12b, with the rubber layers 20, 20 and the raised portions 22a, 22b being formed as integral parts of the rubber block 6. Certainly, the arcuate voids 24a, 24b are formed during vulcanization of the rubber block 6.

In the meantime, the outer sleeve 4 is coated at its inner surface with a sealing rubber layer 28. The outer sleeve 4 with the rubber layer 28 is press-fitted on the sub-assembly 8 constructed and prepared as described above. This fitting operation is conducted within a container filled with a suitable working fluid, usually, an incompressible fluid such as water, alkylene glycol, polyalkylene glycol, silicone, oil, or a mixture thereof. Consequently, the pairs of first and second pockets 14a, 14b, 16a, 16b are fluid-tightly closed by the outer sleeve 4, more precisely, by the sealing rubber layer 28, whereby a pair of first fluid chambers 30a, 30b, and a pair of second fluid chambers 32a, 32b, are formed within the engine mount. Thus, the outer sleeve 4 and the rubber block 6 cooperate with each other to define the first and second fluid chambers 30a, 30b, 32a, 32b, which are filled with the working fluid.

Since the first fluid chambers 30a, 30b, and the second fluid chambers 32a, 32b are formed by the corresponding first and second pockets 14a, 14b and 16a, 16b, the fluid chambers 30a, 30b are opposed to each other in the first diametric direction (vibration-input direction), while the second fluid chambers 32a, 32b are opposed to each other in the second diametric direction perpendicular to the vibration-input direction. The two first fluid chambers 30a, 30b are symmetrical in shape with each other with respect to the inner sleeve 2. Similarly, the two second fluid chambers 32a, 32b are symmetrical with each other.

Further, four orifices 34 are formed with the orifice grooves 26 closed by the sealing rubber layer 28 on the outer sleeve 4. These orifices 34 maintain fluid communication between the first fluid chambers 30a, 30b, and the second fluid chambers 32a, 32b, so that the fluid may flow between the two first fluid chambers 30a, 30b, via the orifices 34, and via the second fluid chambers 32a, 32b.

After the outer sleeve 4 has been press-fitted on the sub-assembly 8, the outer sleeve 4 is subjected to a suitable radial drawing operation, either within the fluid mass in which the press-fitting operation has been conducted, or after the assembled engine mount has been removed from the fluid mass. For example, the drawing operation is effected by using several dies arranged around the outer sleeve 4. Subsequently, the outer sleeve 4 is radially inwardly compressed by passing the engine mount through a suitable die, so that the fluid tightness between the rubber block 6 and the outer sleeve 4 can be improved.

The thus prepared fluid-filled resilient engine mount is installed on the vehicle such that the inner sleeve 2 is secured to one of the power unit and the body of the vehicle, while the outer sleeve 4 is secured to the other. Further, the engine mount is circumferentially positioned so that vibrations are applied to the engine mount, in the first diametric direction (indicated at P in FIGS. 1 and 4) in which the first fluid chambers 30a, 30b are opposed to each other. In other words, the engine mount is oriented such that the first fluid chambers 30a, 30b are disposed in spaced-apart relation in the vertical direction, or such that the vanes 18a, 18b extend in the horizontal direction.

In the event that low-frequency large-amplitude vibrations are applied to the engine mount in the first diametric direction P, the rubber block 6 is elastically deformed, causing a relative displacement between the inner and outer sleeves 2, 4, and volumetric changes of the vertically disposed first fluid chambers 30a, 30b. As a result, the fluid is forced to flow from one of the first fluid chambers 30a, 30b into the second fluid chambers 32a, 32b, and from the second fluid chambers 32a, 32b into the other first fluid chamber 30a, 30b. Then, the fluid is forced to flow in the reverse direction. Thus, the fluid flows alternately in the opposite directions between the two first fluid chambers 30a, 30b, in response to the oscillatory relative displacements of the inner and outer sleeves 2, 4 upon application of the low-frequency vibrational load. These fluid flows are effected through the orifices 34 which communicate with the first and second fluid chambers 30a, 30b, 32a, 32b. Accordingly, the low-frequency vibrations can be effectively damped due to a flow resistance of the fluid through the orifices 34, and an inertia of the fluid masses. A desired range of frequency of the vibrations to be damped by the restricted fluid flows through the orifices 34, may be easily selected by suitably dimensioning the orifices 34. Hence, the instant engine mount provides an excellent effect for damping low-frequency vibrations due to engine shakes.

In the case where high-frequency small-amplitude vibrations are applied to the engine mount, the fluid is extremely difficult to flow through the orifices 34 communicating with the first and second fluid chambers 30a, 30b, 32a, 32b. However, the oscillating displacement of the inner sleeve 2 in the first diametric direction P relative to the outer sleeve 4 will cause an oscillating movement of the pair of vanes 18a, 18b which are fixedly supported on the inner sleeve 2 so as to extend within the respective second fluid chambers 32a, 32b.

As a result of the oscillating movement of the vanes 18a, 18b in the vibration-input direction P, the fluid in each second fluid chamber 32a, 32b is forced to flow through a gap 19 (FIGS. 1 and 2) formed between the periphery of the vane 18a, 18b, and the opposite surfaces of the second fluid chamber 32a, 32b, more precisely, the axially opposed surfaces 6a, 6a and the sealing rubber layer 28. This gap 19, whose cross sectional area is shown in FIG. 2, functions as an orifice which serves to effectively reduce an amount of transfer of the input high-frequency vibrations. That is, the instant engine mount can be given a sufficiently low dynamic spring constant for high-frequency vibrations of a desired frequency range, by suitably dimensioning the vanes 18a, 18b with respect to the periphery of the second fluid chambers 32a, 32b, or by suitably determining the cross sectional area of the gap 19 as measured in a plane parallel to the plane of the vanes (parallel to the axis of the inner sleeve 2), as shown in FIG. 2. Thus, the instant engine mount is capable of minimizing booming noises and thru-engine noises of the vehicle.

As described above, the fluid-filled resilient engine mount is adapted to provide an excellent damping effect for low-frequency vibrations, by means of restricted flows of the fluid between the first fluid chambers 30a, 30b through the orifices 34, while at the same time provide a considerably low dynamic spring constant for effectively isolate high-frequency vibrations, by means of oscillating movements of the vanes 18a, 18b within the fluid masses in the respective second fluid chambers 32a, 32b, and resulting fluid flows through the predetermined gaps 19 formed around the vanes 18a, 18b. Hence, the instant fluid-filled resilient bushing structure used as an engine mount satisfies two requirements, that is, high damping capability for low-frequency vibrations, and low dynamic spring constant to isolate high-frequency vibrations.

Further, since the pair of arcuate voids 24a, 24b formed through the rubber block 6 in the axial direction are disposed in mutually opposed relation in the vibration-input direction, these voids 24a, 24b are conducive to providing the engine mount with softer spring characteristic in the vibration-input direction (first diametric direction), and thereby cooperating with the vanes 18a, 18b to enable the engine mount to exhibit sufficiently soft spring charcteristic upon application of high-frequency vibrations. Moreover, the raised portions 22a, 22b formed so as to protrude within the first fluid chambers 30a, 30b function as radial stop portions which are abuttable against the inner surface of the outer sleeve 4 (more precisely, the rubber layer 28), to prevent an excessive amount of elastic deformation of the rubber block 6, upon application of an excessively large vibrational load in the first diametric direction P.

It is also noted that the rubber layers 20, 20 covering the vanes 18a, 18b within the second fluid chambers 32a, 32b serve to protect the vanes 18a, 18b from rusting, and to reduce an abutting or colliding shock upon abutment of the vanes 18a, 18b against the surfaces of the rubber block 6 due to excessive displacements of the rubber block 6 relative to the vanes 18a, 18b in the first diametric direction or in the axial direction.

Figure 6:
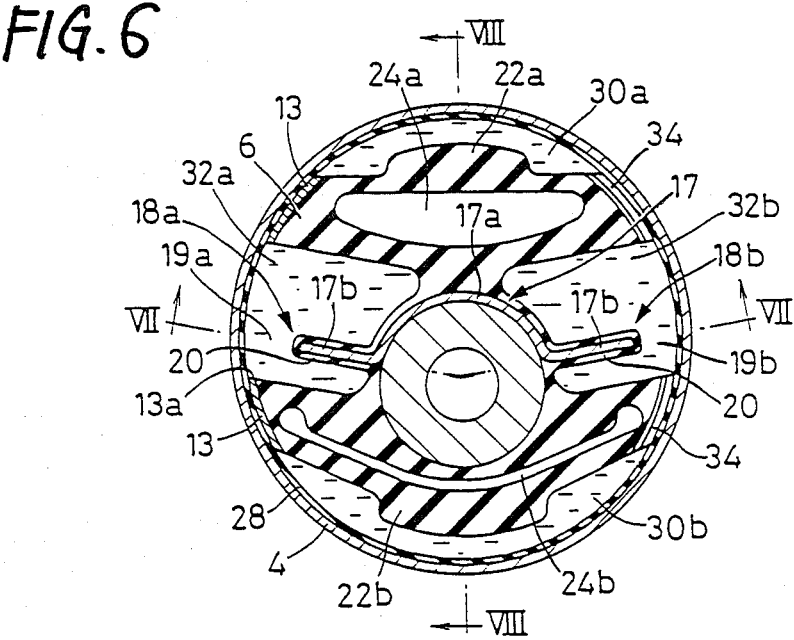
FIG. 6 is an elevational view in transverse cross section of another embodiment of the invention in the form of an engine mount.
Figure 7:
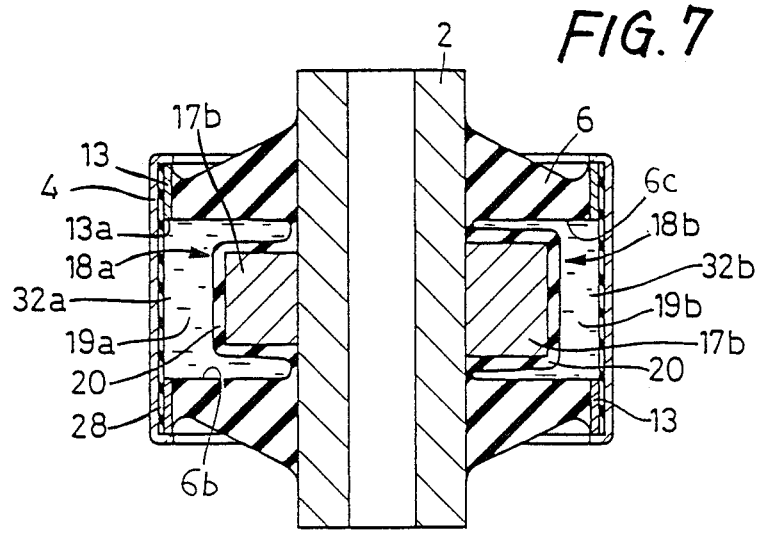
FIGS. 7 and 8 are cross sectional views taken along lines VII—VII and VIII—VIII of FIG. 6, respectively.
Figure 8:
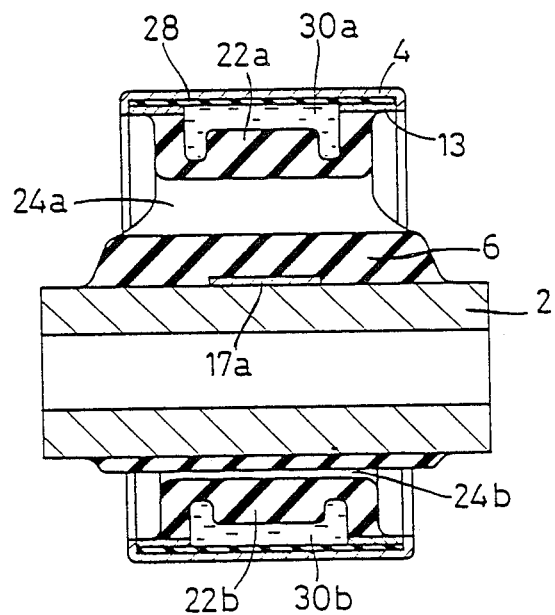

Referring next to FIGS. 6–8, another embodiment of the fluid-filled resilient bushing structure of the invention will be described. In the interest of brevity and simplification, the same reference numerals as used in FIGS. 1–4 will be used to identify the corresponding components, and redundant description of these components will not be provided herein.

In this embodiment, too, the bushing structure is embodied as an engine mount for a motor vehicle. The instant engine mount is different from the preceding embodiment in that the pair of vanes 18a, 18b provided within the second fluid chambers 32a, 32b have different sizes. Described more specifically referring to FIGS. 6 and 7, the vane 18a provided in the second fluid chamber 32a on the left-hand side of the inner sleeve 2 (in the figures) has smaller axial and radial dimensions, than the vane 18b provided in the other second fluid chamber 32b. Accordingly, the cross sectional area of the gap 19a formed between the periphery of the vane 18a and the opposite surfaces of the left, second fluid chamber 32a is larger than that of the gap 19b formed between the periphery of the vane 18b and the opposite surfaces of the right, second fluid chamber 32b, as viewed in planes parallel to the planes of the vanes 18a, 18b (FIG. 7).

According to the above arrangement, the instant modified engine mount exhibits vibration isolation effects for different ranges of frequency of the vibrations applied thereto, due to the different areas of the gaps 19a, 19b provided by the different dimensions of the vanes 18a, 18b in the second fluid chambers 32a, 32b.

In other words, vibrations of different frequency ranges, for example, vibrations causing booming noises, and vibrations causing thru-engine noises, may be effectively isolated by suitably determining the dimensions of the vanes 18a, 18b and therefore the dimensions of the gaps 19a, 19b within the second fluid chambers 32a, 32b, depending upon the desired frequency ranges of the vibrations to be isolated. Therefore, the instant engine mount can deal with a total of three different frequency ranges of vibrations, that is, booming noise vibrations and thru-noise vibrations, in addition to engine shake or idling vibrations to be damped by means of restricted flows of the fluid through the orifices 34 between the first fluid chambers 30a, 30b.

In the present modified embodiment, only the second fluid chamber 32b is held in communication with the pair of first fluid chambers 30a, 30b, through the orifices 34. However, the other second fluid chamber 32a is totally enclosed. Namely, the orifices 34 are not provided for fluid communication between the second fluid chamber 32a and the first fluid chambers 30a, 30b. Even with the totally enclosed second fluid chamber 32a, the vane 18a provided in this fluid chamber may properly function to isolate the vibrations of the appropriate frequency range.

While the preceding embodiment uses the separate two metal rings 12a, 12b fitting on the rubber block 6, the present embodiment uses a single integral metal ring 13 consisting of two axial halves which are connected to each other at their two circumferential portions between the second fluid chamber 32a and the first fluid chambers 30a, 30b. The metal ring 13 has a rectangular aperture 13a alinged with the totally enclosed second fluid chamber 32a. This integral metal ring 13 can be precisely positioned relative to the rubber block 6, upon vulcanization of the rubber block, unlike the separate two metal rings 12a, 12b of the preceding embodiment, which may have a positioning error relative to each other and to the rubber block 6.

The vanes 18a, 18b used in the present embodiment are different in construction from those of the preceding embodiment. That is, the vanes 18a, 18b of the instant engine mount are constituted by the straight planar portions 17b, 17b of a single hat-shaped member 17. The straight planar portions 17b, 17b extending from the opposite ends of the intermediate semi-circular portion 17a have different axial and radial dimensions. That is, the planar portion 17b extending into the second fluid chamber 32a has smaller axial and radial dimensions than the planar portion 17b extending into the other second fluid chamber 32b. The hat-shaped member 17 is secured at its semi-circular portion 17a to the corresponding half of the outer circumferential surface of the inner sleeve 2.

The two different gaps 19a, 19b formed by the two vanes 18a, 18b within the second fluid chambers 32a, 32b are determined by axial distaces between the lateral end faces of the vanes 18a, 18b, and the axially opposed surfaces 6b, 6c of the rubber block 6 that define the axial dimension of the respective second fluid chambers 32a, 32b, and also determined by a radial distance between the radial end face of the vanes 18a, 18b, and the inner surface of the outer sleeve 4 (sealing rubber layer 28). These axial and radial distances of the gaps 19a, 19b are suitably determined depending upon the desired frequency ranges of vibrations to be damped or isolated based on oscillating movements of the vanes 18a, 18b.

While the vanes 18a, 18b in the illustrated embodiments have a straight flat shape, it is possible that these vanes are provided replaced by generally planar blocks or pieces having other suitable configurations. Further, the vanes may have suitable slits, slots or cutouts which permit the fluid to flow therethrough.

Although the inner and outer sleeves 2, 4 of the illustrated fluid-filled resilient bushing structures are disposed eccentrically with each other in the vibration-input o first diametric direction, it is possible that these two sleeves 2, 4 are disposed in concentric or coaxial relation with each other. It is also noted that the principle of the present invention may be practiced without the raised portions 22a, 22b which are formed with the rubber block 6 so as to protrude in the respective first fluid chambers 30a, 30b as radial stops. Stated differently, these stops 22a, 22b are not essential to practice the present invention.

While the present invention has been described in its preferred forms of engine mounts for mounting a power unit on the vehicle, the concept of the present invention may also be suitably embodied as other fluid-filled resilient bushing structures such as bushings used in a suspension system, body mounts, cross-member mounts and differential mounts. In any cases, the specific shapes, dimensions and locations of the fluid chambers 30a, 30b, 32a, 32b formed within the rubber block 6, and the vanes 18a, 18b provided within these fluid chambers, may be determined as needed, depending upon the locations of use and the required spring characteristics of the bushing structures.

While the present invention has been described in detail in its preferred embodiments, along with some possible changes and modifications thereof, it is to be understood that the invention is not limited to the precise details of the disclosure contained herein, but various other changes, modifications and improvements may be made in the invention, without departing from the spirit and scope of the invention defined in the following claims.

What is claimed is:

1. A fluid-filled resilient bushing structure having an inner sleeve, an outer sleeve disposed radially outwardly of the inner sleeve, and a generally annular resilient member interposed between the inner and outer sleeves for elastically connecting the inner and outer sleeves, and thereby primarily damping and isolating vibrations applied in a first diametric direction of the bushing structure, said bushing structure comprising:

first means for defining a pair of first fluid chambers which are disposed in mutually opposed relation with each other in said first diametric direction, such that said inner sleeves is disposed between said first fluid chambers in said first diametric direction;

second means for defining a pair of second fluid chambers which are disposed in mutually opposed relation with each other in a second diametric direction perpendicular to said first diametric direction, such that said inner sleeve is disposed between said second fluid chambers in said second diametric direction;

said first and second pairs of fluid chambers being filled with a working fluid;

third means for defining at least one orifice through which said pair of first fluid chambers communicate with each other, so as to permit said working fluid to flow between said first fluid chambers upon application of said vibrations; and a pair of vanes fixedly supported on said inner sleeve so as to extend therefrom in said pair of second fluid chambers, respectively, toward said outer sleeve, such that said second means and a periphery of each of said pair of vanes cooperate to define a predetermined gap in a plane of said each vane parallel to an axis of the bushing structure, said working fluid filling each of said pair of second fluid chambers being forced to flow through said predetermined gap due to oscillating movement of said pair of vanes relative to said outer sleeve in said first diametric direction upon application of said vibrations in the first diametric direction, said second means comprising said outer sleeve and said resilient member, the predetermined gap in each of said pair of second fluid chamber being defined between the periphery of a corresponding one of said pair of vanes and each of an inner surface of said outer sleeve and axially opposed surfaces of said resilient member which surfaces partially define said each of said pair of second fluid chambers.

2. A fluid-filled resilient bushing structure according to claim 1, wherein said at least one orifice communicates with at least one of said pair of second fluid chambers so that said pair of first fluid chambers communicate with each other via said at least one of the second fluid chambers.

3. A fluid-filled resilient bushing according to claim 1, wherein said resilient member has a pair of voids formed therethrough in an axial direction of the bushing structure, said pair of voids being disposed in mutually opposed relation with each other in said first diametric direction.

4. A fluid-filled resilient bushing structure according to claim 1, further comprising at least one hat-shaped member which has an intermediate semi-circular portion engaging a corresponding half of an outer circumferential surface of said inner sleeve, and a pair of straight planar portions which extend from opposite ends of said semi-circular portion into said pair of second fluid chambers, respectively, thereby functioning as said pair of vanes.

5. A fluid-filled resilient bushing structure according to claim 1, wherein said pair of vanes are dimensioned so that an area of said gap formed in one of said second fluid chambers, as measured in said plane of said each vane, is different from an area of the gap formed in the other of said second fluid chambers.

6. A fluid-filled resilient bushing structure according to claim 1, wherein said resilient member has a pair of pockets formed therein in mutually opposed relation with each other in said first diametric direction, said pockets being open in an outer circumferential surface of said resilient member and closed by said outer sleeve, whereby said pair of first fluid chambers are formed.

7. A fluid-filled resilient bushing structure according to claim 1, wherein said resilient member has a pair of pockets formed therein in mutually opposed relation with each other in said second diametric direction, said pockets being open in an outer circumferential surface of said resilient member and closed by said outer sleeve, whereby said pair of second fluid chambers are formed.

8. A fluid-filled resilient bushing structure according to claim 1, wherein said pair of vanes are covered by a corresponding pair of rubber layers.

9. A fluid-filled resilient bushing structure according to claim 1, wherein said resilient member has a pair of raised portions which protrude in said pair of first fluid chambers so that said raised portions are abuttable against an inner circumferential surface of said outer sleeve.

10. A fluid-filled resilient bushing structure according to claim 9, wherein said resilient member has a pair of voids formed therethrough in an axial direction of the bushing structure, said voids being positioned between said raised portions and said inner sleeve.

11. A fluid-filled resilient bushing structure having an inner sleeve, an outer sleeve disposed radially outwardly of the inner sleeve, and a generally annular resilient member interposed between the inner and outer sleeves for elastically connecting the inner and outer sleeves, and thereby primarily damping and isolating vibrations applied in a first diametric direction of the bushing structure, said bushing structure comprising:
- first means for defining a pair of first fluid chambers which are disposed in mutually opposed relation with each other in said first diametric direction, such that said inner sleeve is disposed between said first fluid chambers in said first diametric direction;
- second means for defining a pair of second fluid chambers which are disposed in mutually opposed relation with each other in a second diametric direction perpendicular to said first diametric direction, such that said inner sleeve is disposed between said second fluid chambers in said second diametric direction;
- said first and second pairs of fluid chambers being filled with a working fluid;
- third means for defining at least one orifice through which said pair of first fluid chambers communicate with each other, so as to permit said working fluid to flow between said first fluid chambers upon application of said vibrations;
- a pair of vanes fixedly supported on said inner sleeve so as to extend therefrom in said pair of second fluid chambers, respectively, toward said outer sleeve, such that said second means and a periphery of each of said pair of vanes cooperate to define a predetermined gap in a plane of said each vanes parallel to an axis of the bushing structure; and
- wherein said at least one orifice communicates with at least one of said pair of second fluid chambers so that said pair of first fluid chambers communicate with each other via said at least one of the second fluid chambers.

* * * * *

UNITED STATES PATENT AND TRADEMARK OFFICE
CERTIFICATE OF CORRECTION

PATENT NO. : 4,871,152
DATED : October 3, 1989
INVENTOR(S) : Y. FUNAHASHI

It is certified that error appears in the above-identified patent and that said Letters Patent is hereby corrected as shown below:

On the title page:
In the "Assignee" portion of the patent, please change "Takai" to --Tokai--.

Signed and Sealed this

Sixteenth Day of October, 1990

*Attest:*

HARRY F. MANBECK, JR.

*Attesting Officer*  *Commissioner of Patents and Trademarks*